April 28, 1970  M. P. HNILICKA, JR  3,508,817

SOUND RECORDING FOR MOTION PICTURE FILMS

Filed Sept. 8, 1966  2 Sheets-Sheet 1

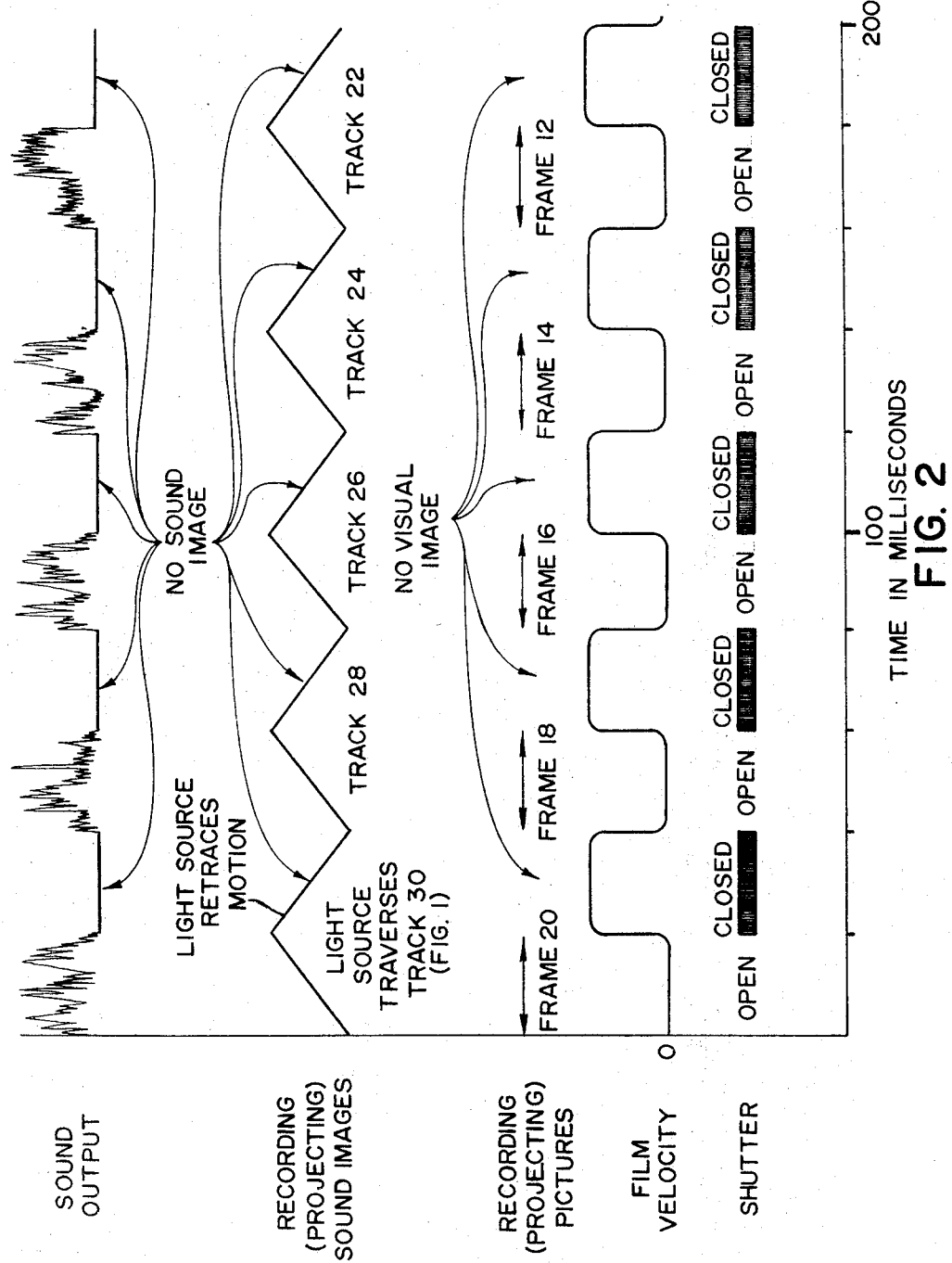

3,508,817
SOUND RECORDING FOR MOTION PICTURE FILMS
Milo P. Hnilicka, Jr., Concord, Mass., assignor to National Research Corporation, Newton, Mass., a corporation of Massachusetts
Filed Sept. 8, 1966, Ser. No. 577,940
Int. Cl. G03b 31/02
U.S. Cl. 352—27                          1 Claim

ABSTRACT OF THE DISCLOSURE

Sound motion picture apparatus in which the sound is recorded in transverse strips between the frames on the motion picture film. During the time when the intermittently moving film is stopped on electroluminescent diode light source is driven transversely of the film to record a variable density sound track.

---

Figure 1:
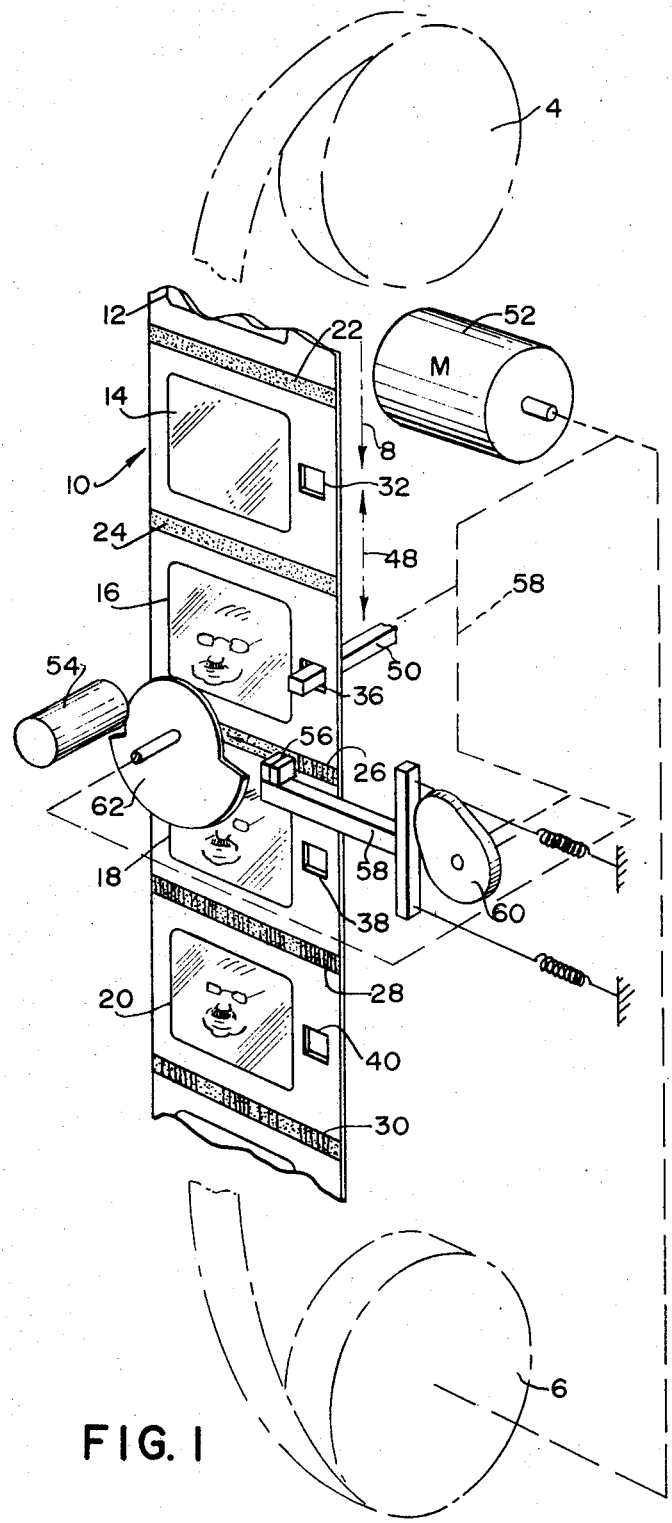

The present invention relates to motion picture films with sound recording and particularly to recording the sound portion of the film. This art extends back to the previous century and has been the subject of very intensive technical development and commercial exploitation, since at least the mid-1920's.

BACKGROUND OF THE INVENTION

The conventional method for recording a motion picture sound track is to space the corresponding visual and sound sections of the film apart by a distance of some 20–30 visual image frames. This gap allows a series of visual or picture frames to be driven past the picture taking shutter with a series of intermittent stops for taking a series of still pictures; the corresponding sound portion of the film is meanwhile driven past an optical or magnetic recording head at constant speed to record a sound image. The intervening film sags into a controlled buffer loop to accommodate this differential drive. A similar arrangement prevails in the reproduction of the sound film in a projector where the image/sound separation is utilized to drive the frames past a projection lens with intermittent stops while the corresponding sound section is driven past a sound pickup at constant speed.

The reason for this duality of motion in handling of the corresponding visual and sound recordings is, of course, that the visual part of motion pictures operates on the basic principle of presenting a series of still pictures at sufficiently high speed so that the physiological phenomenon of persistence of vision gives the viewer the impression of motion whereas high fidelity sound reproduction utilizes a continuous displacement of the sound track past the transducer. The mechanical problem is quite complex. According to the authorities in the field, "the problem of providing uniform motion of the medium past the point of translation in film and disk recording and reproducing machines has probably received more attention from sound engineers since the introduction of sound pictures than any other single item in the whole field of sound-recording engineering" (Frayne and Wolfe; Elements of Sound Recording; John Wiley, Inc., New York, 1949). The problem was formidable enough in handling of 35 mm. theatrical films by professional operators. It has been compounded since World War II by the introduction of 16 mm. and 8 mm. film for business, educational and home movies made by amateurs.

OBJECTS

It is therefore the object of the present invention to provide a method of and apparatus for recording sound on motion picture films and reproducing the sound. The method and apparatus are intended to afford the advantages of simplifying the construction and operation of recorders and reproducers; increasing the writing speed of the sound track (which allows recording of higher frequencies in the same time interval), and allowing adjacent positioning of corresponding sound and visual images if desired. Consistent with the foregoing objects, the present invention is capable of incorporating into existing film equipment, including cartridge film packs, with practical modifications of the basic equipment and the film. Other objects, features and advantages will be apparent from the specification of the invention below.

GENERAL DESCRIPTION

In this invention, motion pictures with sound are made by exposing successive picture frames on the film to a static pause before the lens, in the usual manner, and simultaneously recording the sound image on a corresponding sound track portion of the film which, contrary to usual practice, is held stationary while a transducer is translated with respect to the film to record a variable density sound image along the track. The transducer comprises an electroluminescent diode whose light output is controlled by an audio modulated input representing the sound to be recorded. Preferably, the sound tracks are arranged transversely of the film between picture frames to provide a maximum length sound track associated with each picture; i.e., the full width of the film, and preferably the conventional sound/image separation is not utilized since the invention eliminates the need for such separation.

Readout or reproduction of the sound film is accomplished in essentially the same way as the recording. A narrow light source is translated parallel to the sound track while the sound track portion is stationary along with its corresponding visual image portion. Just as the physiological phenomenon of persistence of vision gives the film viewer's eyes an impression of motion of the visual images, a corresponding impression—"persistence of sound," if you will—is registered by the viewer's ears. The ear is even less sensitive than the eye in this respect so that there can be no fear of noticeable pauses in the sound performance.

Thus, my invention consists, in its most basic statement, of adding "trompe-l'oreille" to the cinema's conventional use of "trompe-l'oeil."

The rate of frames per second exposure of successive visual image frames sets the principal constraint for speed of sound recording. For instance, Super 8 film which is exposed at 24 frames per second corresponds to a cycle time of 41.6 milliseconds. This is broken down into a exposure time for each frame of about 21.6 milliseconds for taking a picture and a transport time of 20 milliseconds for advancing the picture frames. In the preferred embodiment, described below, the corresponding sound record is entirely written during the exposure time. In the preferred embodiment the thin space between picture frames is used for the sound track, the length of this space extends the width of the film (.316 inch for Super 8 film). The minimum allowable writing speed is thus 15.7 inches per second. There are several transducers which can meet this limitation. In the preferred embodiment, the transducer of choice is an electroluminescent diode, as noted above in the Abstract. The low heat output and the thin light output of the diode allow it to be held adjacent the film sound track. The low inertia of the diode allows it to be moved rapidly enough to accommodate the high speeds necessarily entailed in motion picture making. The small size of the transducer system, even with associated translating equipment, aids the desired goal of camera portability since it eliminates the flywheel of conventional cameras. The small size of the transducer allows it to be put next to the picture making lens for making adjacent corresponding picture and sound sections.

Retrace of the transducer takes place during the transport time portion of the film advance cycle. This applies to both recording and reproducing. Since the transducer has to cross the film during retrace, the light output is cut off or at least reduced to a level of intensity below the sensitivity of the picture and sound track emulsions, to avoid creating unwanted smears on the film. Another contribution of an electrolumiscent diode to the recorder of the present invention is its good frequency response. In recording or reproducing the film, the camera or projector, respectively, should be arranged to block the input of the audio amplifier between frames. This can be suitably accomplished by use of commutator switches of the type used in international telephony for sharing of a common channel by several telephone transmissions. The commutator would be driven off the film drive to assure synchronism of operation.

The preferred embodiment of the invention is now further explained below with reference to the accompanying drawing wherein:

FIG. 1 is a schematic representation of the film recording apparatus (which is essentially similar to the projection apparatus) showing a portion of a film being recorded with visual and sound images.

Figure 1A:
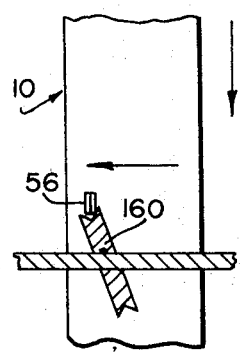
Figure 1B:
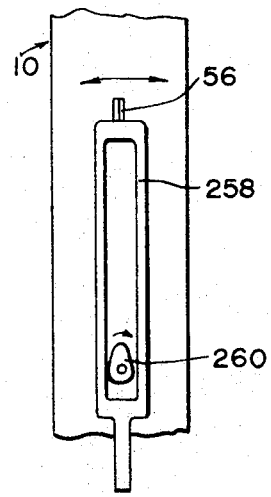
Figure 1C:
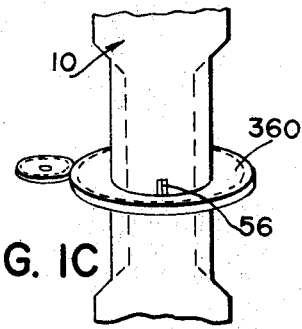

FIGS. 1A, 1B, and 1C are schematic representations of other embodiments with alternative driving linkages for the light source.

FIG. 2 is a time chart showing the repetitive operations of the sound and picture recording cycle.

Referring now to FIG. 1, there is shown a motion picture film 10 comprising a longitudinal series of visual image frames 12, 14, 16, 18, 20. The film is driven continuously by motor 52 in the direction indicated by arrow 8 and is also driven intermittently from motor 52 by pawl 50. Pawl 50 holds a frame in front of the lens for a cyclic period on the order of milliseconds and then reaches back to pull the next frame forward. There is sufficient slack in the feed and take-up reels 4 and 6 to allow the intermediate portion of the film to be held stationary by pawl 50 for each ½ cycle of pawl operation. The spacing and size of the visual image frames should be in accord with ASA standards, but is shown differently here for clarity of the figure. Between the visual image frames and running perpendicular to the film are a series of sound track sections 22, 24, 26, 28, 30. The sound recorded on sound track 22 corresponds to the picture at 12, the sound track 24 corresponds to the picture at 14, and the other corresponding pictures and sound tracks have a similar adjacent location. Sprocket holes 32, 34, 36, 38, 40 are provided in the film with a spacing according to ASA standards.

It will be understood that the picture areas 12 and 14 and the sound track areas 22, 24 and part of 26 are only potential sites of picture and sound images and, until exposed, do not differ from the surrounding film.

At the picture taking locations, a pawl 50 is driven intermittently by a motor 52 via a gear train to reciprocate as shown by the arrow 48. The pawl advances the film by one frame between picture taking stops. Although not shown here the usual pressure plate is provided behind the film and the usual aperture plate in front of the film at the picture taking location. A slot is cut in the pressure plate to accommodate the pawl 50. Precise apertures are machined in the aperture plate 56 for the picture being taken (frame 16 at the instant shown in the drawing), and for the sound track being recorded (track 26 at the instant shown in the drawing).

The pictures are taken in series through a lens system 54. The sound is "written" by an electroluminescent diode 56. The diode is on a mount 58 forming part of a cam or crank linkage 60 driven by the same gear train 58 which drives the pawl and shutter and synchronized so that the diode 56 is moved while the film is stationary. The movement of the diode is to the right parallel to sound track 26. While the film is moving, between pictures, the linkage is driven to return the diode to its original position in preparation for the next sound track (24). The same linkage also drives a shutter 62.

The electroluminescent diode light source is a silicon carbide diode of the type described in the copending application of Miller and Vitkus, Ser. No. 556,408, filed June 9, 1966. The diode is preferably positioned within .002 inch of the film surface, as taught by Miller and Vitkus. The sound track recorded is of the variable density type.

The mechanical arrangement of a reproducer or projector for sound motion pictures would be essentially the same as in the recorder shown in FIG. 1. Instead of a picture taking lens, there would be a projection lens and instead of the diode 56 there would be a photocell pickup or a small light source traversing parallel to the sound track.

Referring now to FIG. 2, the cycle of picture and sound recording are depicted on a chart with the cycle time being based on standard running time for 8 mm. film which is 24 frames per second giving a cycle time of 41.6 milliseconds. This is divided into an exposure time of about 20 milliseconds ($20/1000$ of a second) and a transport time of 21.6 milliseconds. The width of the film is 0.315 inch. The allowable writing speed is thus 15.7 inches per second [1] which is about *four times the writing speed* [2] *of conventional constant-speed optical recording of sound tracks on a constant speed sound track*. Thus, with the use of this invention, one can produce sound quality on 8 mm. film approaching the quality of 35 mm. sound.

The parameters plotted on FIG. 2 are shutter operation and film velocity which control recording of visual images (pictures) and sound images. Finally, the sound output is shown. The sound output is obtained during the half cycles when the light source is traversing the sound track length in the camera (or in the projector as the case may be). The corresponding picture recording (or projection) takes place at the same time.

Alternative light source drives are shown in FIGS. 1A, 1B and 1C. In FIG. 1A an angled wheel 160 causes the light source 56 to track back and forth transversely to the film movement direction. The wheel could also be bent so as to smooth out the usual sinusoidal velocity profile and hold light source velocity essentially constant. In FIG. 1B a pivotal mount 258 is driven back and forth by a cam 260, this linkage being similar to the conventional pawl linkage used in some motion picture cameras. The departure of the arc motion of the light source from linear is negligible for sound film purposes in recording a variable density track and in view of the narrow width of the film. In FIG. 1C the light source 56 is mounted on a rotating hollow wheel; the film is bent into the wheel over guides (not shown) to occupy 180° of the path of the light source. It would be necessary to have an image/sound separation in this embodiment and a second pawl to precisely stop and position the sound track at the same time as its corresponding picture frame.

It will be appreciated by those skilled in the art that further variation may be made from the preferred embodiment. For instance, the sound tracks could be arranged along the side margin of the film rather than between picture frames for greater compatibility with existing camera, printing, and projector equipment. However, this would only double the frequency range of conventional recording (compared to a four times increase with the transverse track). Another variation within the

---

[1] See the following equation:

$$\frac{0.315 \text{ in.}}{21.6 \times 10^{-3} \text{ sec.}} = 1.57 \frac{\text{in.}}{\text{sec.}}$$

[2] See the following equation:

$$\frac{0.166 \text{ in. film pitch}}{41.6 \times 10^{-3} \text{ sec.}} = 4 \text{ in./sec.}$$

scope of the invention is that the timing of film drive could be varied to provide a longer sound recording time by leaving the film stationary for up to 75% of frame cycle by using a shorter transport time in each cycle. Thus the interval when the sound information is missing can be substantially reduced. Still other variations will occur to those skilled in the art. It is therefore intended that the above disclosure shall be read as illustrative and not in a limiting sense.

What is claimed is:

1. An apparatus for recording a sound image on motion picture film containing a plurality of sound track sections extending transversely of the film between adjacent frames, the apparatus comprising intermittent-drive film advancing means for advancing the film in a longitudinal direction, an electroluminescent diode light source, light source advancing means for holding the light source adjacent the sound track section of the film and intermittently advancing the light source in a path extending transversely of the film and parallel to the sound track section during the interval when the intermittent-drive film advancing means is not advancing the film, and means for feeding a sound modulated electric signal to the light source while it is in motion.

References Cited

UNITED STATES PATENTS

| | | | |
|---|---|---|---|
| 2,144,738 | 1/1939 | Musumeci | 352—26 |
| 2,881,353 | 4/1959 | Michlin | 250—80 |
| 2,894,854 | 7/1959 | MacIntyre et al. | 250—80 |
| 3,241,472 | 3/1966 | Robertson | 95—73 |
| 3,379,095 | 4/1968 | Kaprellian | 352—37 |

FOREIGN PATENTS 337,151  10/1930  Great Britain.

NORTON ANSHER, Primary Examiner

M. H. HAYES, Assistant Examiner

U.S. Cl. X.R.

352—5, 37